(12) United States Patent
Lee et al.

(10) Patent No.: US 6,867,835 B2
(45) Date of Patent: Mar. 15, 2005

(54) IN-PLANE SWITCHING LCD PANEL HAVING DIFFERENT ALIGNMENT LAYERS

(75) Inventors: Byung-Hyun Lee, Kyoungsangbuk-do (KR); Young-Suk Choi, Kyoungsangbuk-do (KR)

(73) Assignee: LG. Philips LCD Co., Ltd., Seoul (KR)

( * ) Notice: Subject to any disclaimer, the term of this patent is extended or adjusted under 35 U.S.C. 154(b) by 217 days.

(21) Appl. No.: 09/938,607

(22) Filed: Aug. 27, 2001

(65) Prior Publication Data

US 2002/0047976 A1 Apr. 25, 2002

(30) Foreign Application Priority Data

Aug. 28, 2000 (KR) ........................................ 2000-50124

(51) Int. Cl.⁷ ............................................ G02F 1/1337
(52) U.S. Cl. ...................... 349/124; 349/123; 349/128; 349/135
(58) Field of Search ................................ 349/124, 128, 349/135, 123

(56) References Cited

U.S. PATENT DOCUMENTS

| | | | | |
|---|---|---|---|---|
| 5,353,140 A | * | 10/1994 | Yamazaki et al. | ............ 359/75 |
| 5,917,569 A | * | 6/1999 | Tanuma et al. | ............ 349/123 |
| 5,949,511 A | * | 9/1999 | Park | ............ 349/139 |
| 5,986,735 A | * | 11/1999 | Komatsu | ............ 349/128 |
| 5,995,186 A | * | 11/1999 | Hiroshi | ............ 349/141 |
| 6,020,946 A | * | 2/2000 | Callegari et al. | ............ 349/124 |
| 6,061,114 A | * | 5/2000 | Callegari et al. | ............ 349/125 |
| 6,078,375 A | * | 6/2000 | Matsumoto et al. | ............ 349/123 |
| 6,184,959 B1 | * | 2/2001 | Izumi | ............ 349/124 |
| 6,184,961 B1 | * | 2/2001 | Ham | ............ 349/141 |
| 6,278,427 B1 | * | 8/2001 | Matsumoto et al. | ............ 345/88 |
| 6,529,256 B1 | * | 3/2003 | Seo | ............ 349/141 |
| 2002/0047973 A1 | * | 4/2002 | Matsumoto | ............ 349/141 |

FOREIGN PATENT DOCUMENTS

| | | | |
|---|---|---|---|
| EP | 0 903 614 A2 | * | 3/1999 |
| GB | 2331591 | * | 5/1999 |
| JP | 2000-338493 | * | 12/2000 |
| JP | 2001-108995 | * | 4/2001 |
| KR | 1995-9298 | | 4/1995 |
| KR | 98022385 A | * | 7/1998 |
| KR | 1998-77350 | | 11/1998 |
| KR | 10-0208970 B1 | | 4/1999 |
| KR | 1999-69542 | | 9/1999 |

* cited by examiner

*Primary Examiner*—Nathan J. Flynn
*Assistant Examiner*—Ahmed N. Sefer
(74) *Attorney, Agent, or Firm*—Birch, Stewart, Kolasch & Birch, LLP

(57) ABSTRACT

The present invention discloses an IPS LCD device including a first and second substrate opposing with each other, a common electrode on an inner surface of the first substrate, a pixel electrode parallel to the common electrode, a first alignment layer covering the common and pixel electrodes, wherein the first alignment layer is rubbed, a second alignment layer on an inner surface of the upper substrate, wherein the second alignment layer is photo-aligned, and a liquid crystal layer between the first and second substrates.

7 Claims, 3 Drawing Sheets

IN-PLANE SWITCHING LCD PANEL HAVING DIFFERENT ALIGNMENT LAYERS

CROSS REFERENCE

This application claims the benefit of Korean Patent Application No. 2000-50124, filed on Aug. 28, 2000, under 35 U.S.C. § 119, the entirety of which is hereby incorporated by reference.

BACKGROUND OF THE INVENTION

1. Field of the Invention

The present invention relates to a liquid crystal display device, and more particularly to a liquid crystal display device implementing in-plane switching (IPS) where an electric field to be applied to a liquid crystal is generated in a plane parallel to a substrate.

2. Description of Related Art

Recently, light and thin liquid crystal display (LCD) devices with low power consumption are used in office automation equipment, video devices, and the like. Such LCD's typically use an optical anisotropy and spontaneous polarization of a liquid crystal (LC). The liquid crystal has a thin and long liquid crystal molecule, which causes a directional alignment of the liquid crystal molecules. At this point, an alignment direction of the liquid crystal molecules is controlled by applying an electric field to the liquid crystal molecules. When the alignment direction of the liquid crystal molecules is properly adjusted, light is refracted along the alignment direction of the liquid crystal molecules to display image data. Of particular interest is an active matrix (AM) LCD, in which a plurality of thin film transistors and pixel electrodes are arranged in the shape of an array matrix, because of its high resolution and superiority in displaying moving pictures. Driving methods for such LCD's typically include a twisted nematic (TN) mode and a super twisted nematic (STN) mode. A TN liquid crystal panel has high transmittance and aperture ratio. In addition, since the common electrode on the upper substrate serves as a ground, static electricity is prevented from destroying the liquid crystal panel.

Although TN LCD's and STN LCD's, which have the same structure, have been put to practical use, they have a drawback in that they have a very narrow viewing angle. In order to avoid the problem of narrow viewing angle, IPS LCD devices have been proposed. IPS LCD devices typically include a lower substrate where a pixel electrode and a common electrode are disposed, an upper substrate having no electrode, and a liquid crystal interposed between the upper and lower substrates. The IPS LCD device has advantages in contrast ratio, gray inversion, and color shift that are related to the viewing angle.

FIG. 1A is a plan view illustrating in detail the structure of one pixel region in an IPS-LCD device, specifically, a unit pixel region 10. In addition, a cross-sectional view taken along a line "B—B" in FIG. 1A is illustrated in FIG. 1B.

On the surface of a lower substrate 1a adjacent to the liquid crystal layer, a scan signal line 2 made of, for example, aluminum (Al) is formed extending along the x-direction, as shown in FIG. 1A. In addition, a reference signal line 4, also known as a common line, is formed extending along the x-direction, close to the scan signal line 2 on the +y-direction side thereof. The reference signal line 4 is also made of, for example, Al. A region surrounded by the scan signal line 2, the reference signal line 4, and the video signal lines 3 constitutes the unit pixel region 10.

In addition, the unit pixel region 10 includes a reference electrode 14 formed by the reference signal line 4 (identified as 4(14)), and another reference electrode 14 formed adjacent to the scan signal line 2. The pair of horizontally extending reference electrodes 14 are positioned adjacent to one of a pair of video signal lines 3 (on the right side of the FIG. 1A), and are electrically connected to each other through a conductive layer 14a, which is formed simultaneously with the reference electrodes 14.

In the structure described above, the reference electrodes 14 form a pair extending in the direction parallel to the scan signal line 2. In other words, the reference electrodes form a strip extending in a direction perpendicular to the video signal lines 3, later described.

A first insulating layer 11 (see FIG. 1B) made of, for example, silicon nitride is formed on the surface of the lower substrate 1a on which the scan signal lines 2 are formed, overlying the scan signal line 2, the reference signal lines 4, and the reference electrodes 14. The first insulating layer 11 functions as an inter-layer insulating film for insulating the scan signal line 2 and the reference signal line 4 from the video signal lines 3, (b) as a gate-insulating layer for a region in which a thin film transistor (TFT) is formed, and (c) as a dielectric film for a region in which a capacitor "Cstg" is formed. The TFT includes a drain electrode 3a and a source electrode 15a. A semiconductor layer 12 for the TFT is formed near a crossing point of the scan signal line 2 and video signal line 3. A first polarization layer 18 is formed on the other surface of the lower substrate 1a.

On the first insulating layer 11, a display electrode 15 is formed parallel with the reference electrode 14. One end portion of the display electrode 15 is electrically connected to the conductive layer 14a, and the other end portion thereof is electrically connected to the source electrode 15a. Still on the first insulating layer 11, a first planar layer 16 is formed to cover the display electrode 15. A first alignment layer 17 is formed on the first planar layer 16.

FIG. 1B also illustrates a cross-sectional view of the upper substrate 1b on which a black matrix 300 is formed. A color filter 25 is formed to close an opening in the black matrix 300. Then, a second planar layer 27 is formed to cover the color filter 25 and the black matrix 300. A second alignment layer 28 is formed on the surface of the second planar layer 27 facing the liquid crystal layer.

The color filter 25 is formed to define three unit pixel regions adjacent to and extending along the video signal line 3 and to position a red (R) filter, a green (G) filter, and a blue (B) filter, for example, from the top of the three unit pixel regions. The three unit pixel regions constitute one pixel region for color display.

A second polarization layer 29 is also arranged on the surface of the upper substrate 1b that is opposite to the surface of the upper substrate 1b adjacent to the liquid crystal layer, on which various layers are formed as described above.

It will be understood that in FIG. 1B, a voltage applied between the reference electrodes 14 and the display electrode 15 causes an electric field "E" to be generated in the liquid crystal layer "LC" in parallel with the respective surfaces of the lower and upper substrates 1a and 1b. This is why the illustrated structure is referred to as the in plane switching, as mentioned above.

With reference to FIGS. 2, 3A, and 3B, operation modes of a typical IPS LCD device are explained in detail.

FIG. 2 is a conceptual cross-sectional view illustrating a typical IPS LCD device. As shown, lower and upper substrates 1a and 1b are spaced apart from each other, and a liquid crystal "LC" is interposed therebetween. The lower and upper substrates 1a and 1b are called an array substrate and a color filter substrate, respectively. On the lower substrate 1a, pixel and common electrodes 15 and 14 are disposed. The display and reference electrodes 15 and 14 are positioned parallel with and spaced apart from each other. On a surface of the upper substrate 1b, a color filter 25 is disposed opposing the lower substrate 1a. The display and reference electrodes 15 and 14 apply an electric field "E" to the liquid crystal "LC". The liquid crystal "LC" has a negative dielectric anisotropy, and thus it is aligned parallel to the electric field "E". The display electrode 15 and reference electrode 14 are also referred to as the pixel electrode 15 and common electrode 14.

FIGS. 3A and 3B illustrate operation modes for the typical IPS-LCD device shown in FIG. 2. For an off state, the long axes of the liquid crystal molecules "LC" maintain some angle with respect to an invisible line that is perpendicular to the pixel and common electrodes 15 and 14. The angle is 45 degrees, for example. At this point, the pixel and common electrodes 15 and 14 are parallel with each other.

For an on state, an in-plane electric field "E", which is parallel to the surface of the lower substrate 1a, is generated between the pixel and common electrodes 15 and 14. The reason is that the pixel electrode 15 and common electrode 14 are formed together on the lower substrate 1a. Then, the liquid crystal molecules "LC" are twisted such that the long axes thereof coincide with the electric field direction. Thereby, the liquid crystal molecules "LC" are aligned such that the long axes thereof are perpendicular to the pixel and common electrodes 15 and 14. The liquid crystal used in the above-mentioned IPS LCD panel includes a negative dielectric anisotropy.

Returning to FIG. 1B, the second alignment layer 28 is formed on the second planar layer 27. The second planar layer 27 is an overcoat made of acrylate-based or epoxy-based resin and serves to protect the color filter 25. In addition, the second planar layer 27 compensates for stepped portions due to the color filter 25 such that a platen surface is provided for the upper substrate 1b having the color filter 25. After the second planar layer 27 and second alignment layer 28 are sequentially formed on the color filter 25, the second alignment layer 28 is rubbed using a rubbing roller. Then, the second alignment layer 28 has an alignment direction for "off state" of the liquid crystal molecules "LC" shown in FIG. 4A. At this point, because the second planar layer 27 is relatively soft, it is stained during the above-mentioned rubbing step such that an abnormal line pattern is formed thereon. If the alignment layer is stained, the liquid crystal molecules are abnormally aligned in off state.

For the foregoing reason, there is a need for an IPS LCD device that prevents the above-mentioned stained error of the alignment layer.

SUMMARY OF THE INVENTION

To overcome the problems described above, the present invention provides an IPS LCD device, which has a structure that prevents the stained error of the alignment layer, and a fabricating method thereof.

The present invention, in part, provides an IPS LCD device, which includes: first and second substrate opposing with each other; a common electrode on an inner surface of the first substrate; a pixel electrode parallel to the common electrode; a first alignment layer covering the common and pixel electrodes, wherein the first alignment layer is rubbed; a second alignment layer on an inner surface of the upper substrate, wherein the second alignment layer is photo-aligned; and a liquid crystal layer between the first and second substrates.

The second alignment layer includes a photo-sensitive material. Specifically, the second alignment layer is a photolysis type polymer or a photo-crosslinkable polymer.

A dichroic subtraction of the second alignment layer is larger than 0.025 inclusive.

A surface of the second alignment layer has a pencil hardness of 1H to 5H both inclusive.

The first alignment layer has a greater anchoring energy than the second alignment layer has.

Liquid crystal molecules of the liquid crystal layer are at an angle of 0 exclusive to 3 inclusive with respect to the first and second alignment layers.

The present invention, also in part, provides a method for fabricating an IPS LCD device. The method includes: preparing a first substrate; forming a common electrode and a pixel electrode on the first substrate, the common electrode and pixel electrode being parallel to each other; forming a first alignment layer on the common and pixel electrodes and rubbing the first alignment layer; preparing a second substrate; forming a second alignment layer on the second substrate and photo-aligning the second alignment layer; arranging first and second substrates such that the first and second alignment layers oppose with each other; and forming a liquid crystal layer between the first and second substrates.

A partially polarized ray is used for photo-aligning the second alignment layer. The partially polarized ray has a polarization ratio of above 4 inclusive for 350 nm, or has a polarization ratio of above 8 inclusive for 280 nm Advantages of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus do not limit the present invention.

In the accompanying drawings, like reference numerals denote like parts.

DETAILED DESCRIPTION OF PREFFERED EMBODIMENTS

Reference will now be made in detail to embodiments of the present invention, examples of which are illustrated in the accompanying drawings.

Figure 1A:
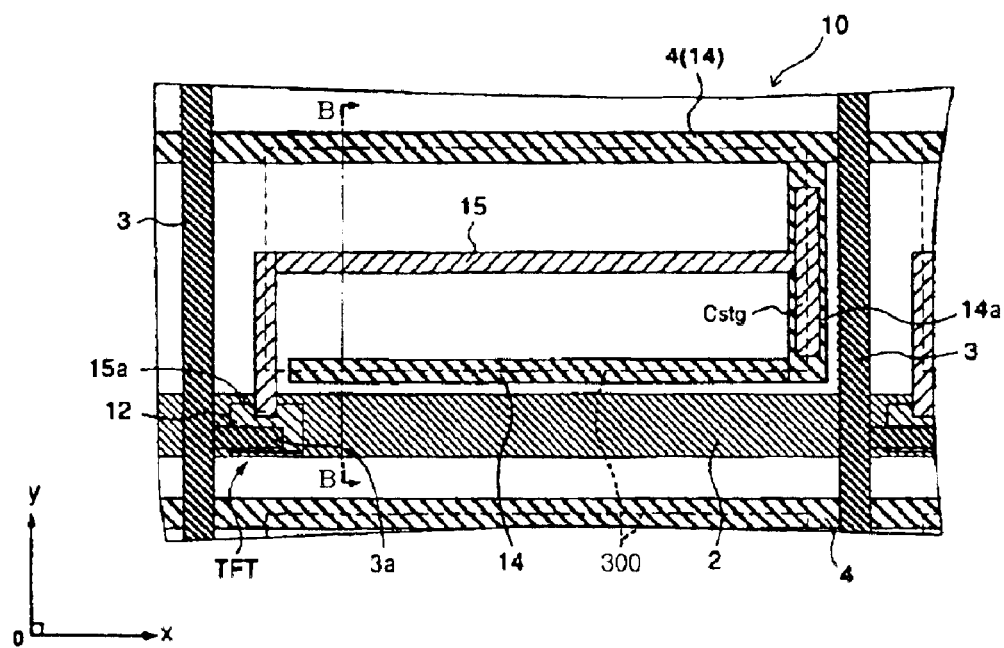
FIG. 1A is a plan view illustrating an IPS LCD device according to the related art.
Figure 1B:
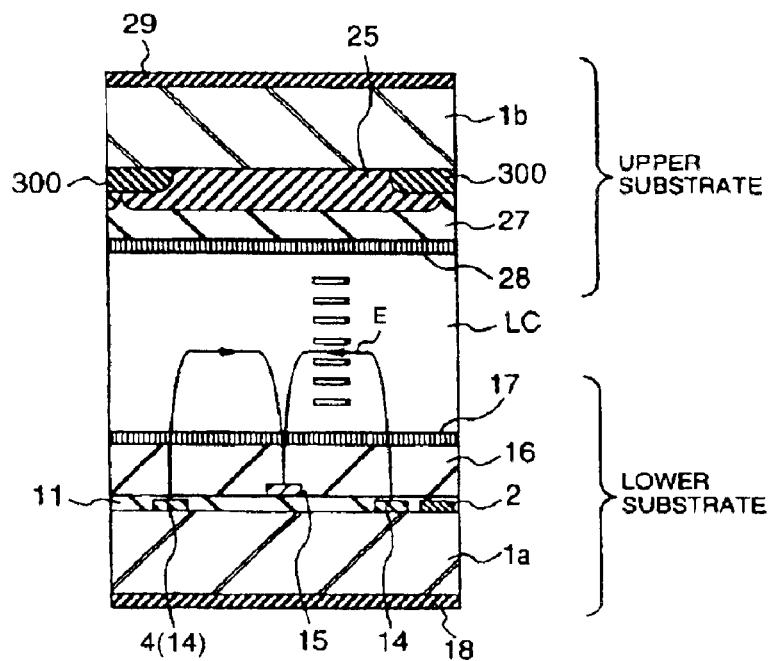
FIG. 1B is a cross-sectional view taken along a line "B—B" of FIG. 1A.
Figure 2:
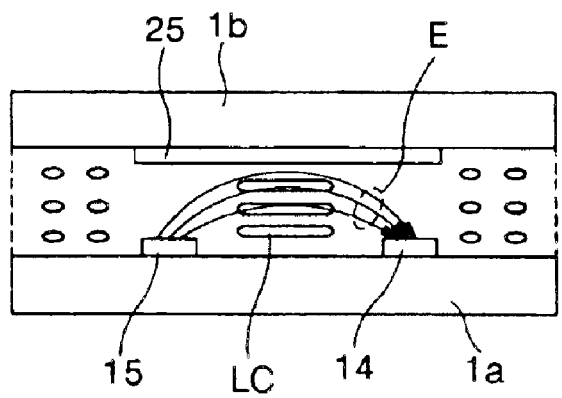
FIG. 2 is a conceptual cross-sectional view illustrating a typical IPS LCD device.
Figure 3A:
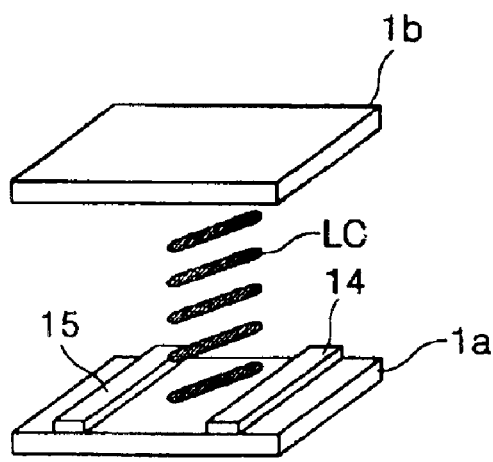
FIG. 3A is a perspective view illustrating "off state" of the IPS LCD device of FIG. 2.
Figure 3B:
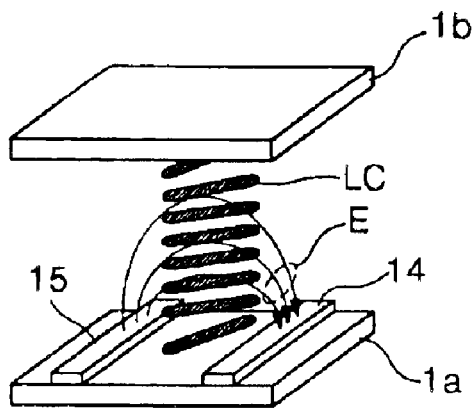
FIG. 3B is a perspective view illustrating "on state" of the IPS LCD device of FIG. 2.
Figure 4:
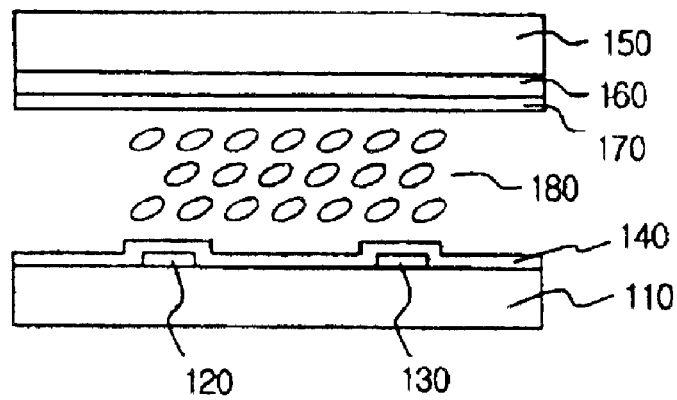
FIG. 4 is a cross-sectional view illustrating an IPS LCD device according to a preferred embodiment of the present invention.

In FIG. 4, a lower substrate 110 and an upper substrate 150 oppose each other, and a liquid crystal layer 180 is interposed therebetween. The lower and upper substrates 110 and 150 include a thin film transistor (not shown) and a color filter (not shown), respectively. On an inner surface of the lower substrate 110, a common electrode 120 and a pixel electrode 130 are formed with an interval therebetween. A first alignment layer 140 is formed over the lower substrate 110 such that it covers the common and pixel electrodes 120 and 130. On an inner surface of the upper substrate 150, a planar layer 160 and a second alignment layer 170 are sequentially formed. The planar layer 160 is preferably made of acrylate-based or epoxy-based resin and serves to protect the color filter (not shown), which is formed on the inner surface of the upper substrate 150. The planar layer 160 further serves to platen the inner surface of the upper substrate 150 where the color filter (not shown) is formed, but may be omitted.

The liquid crystal molecules of the liquid crystal layer 180 are aligned with respect to the common and pixel electrodes 120 and 130. The alignment state of the liquid crystal molecules depends on alignment directions of the first and second alignment layers 140 and 170. The alignment of the liquid crystal molecules must be carefully controlled, because the alignment thereof affects a response property of the liquid crystal molecules when an electric field is applied to the liquid crystal molecules. The first and second alignment layers 140 and 170 are rubbed and photo-aligned, respectively, each to have an alignment direction such that they serve to control the above-mentioned alignment of the liquid crystal molecules 180. To prevent a stained error of the second alignment layer 170, the second alignment layer 170 is formed differently from the first alignment layer 140, which is explained below.

Figure 5:
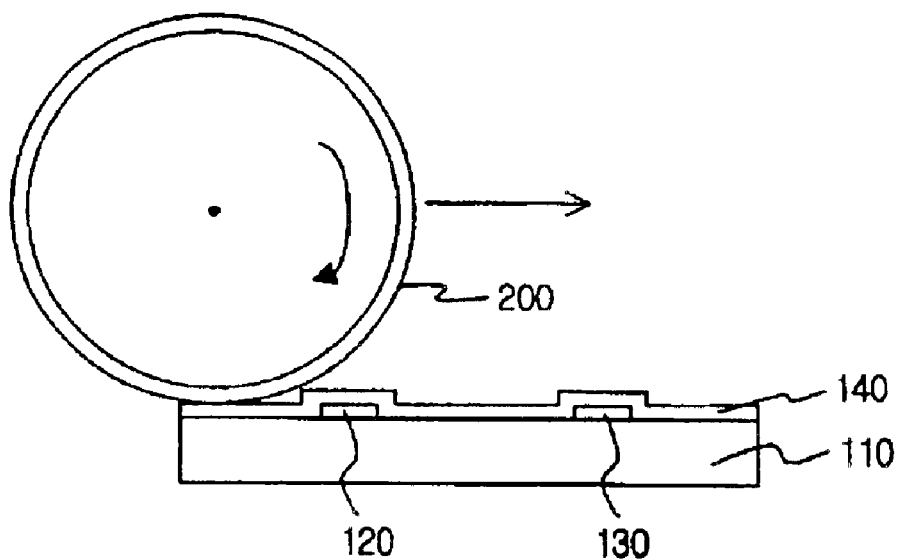
FIG. 5 is an elevational view illustrating that a first alignment layer is formed on a lower substrate.
Figure 6:
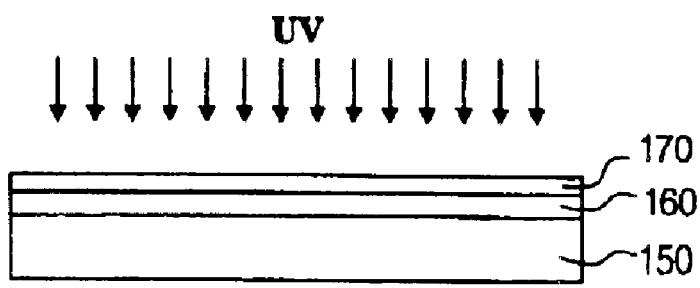
FIG. 6 is an elevational view illustrating that a second alignment layer is formed on an upper substrate.

With reference to FIGS. 5 and 6, different methods of forming the first and second alignment layers 140 and 170 are explained, respectively.

As shown in FIG. 5, the first alignment layer 140 is formed on the lower substrate 110 having the common and pixel electrodes 120 and 130. To form the first alignment layer 140, a polymer, which is preferably a polyimide-based material, is deposited and hardened on the lower substrate 110. Then, a surface of the first alignment layer 140 is rubbed using a rubbing roller 200 such that a plurality of microgrooves are formed in a uniform direction on the surface. The direction of the microgrooves on the lower substrate surface is the same as the rubbing direction of the rubbing roller 200. At this point, the rubbing roller 200 has a much larger diameter than the height of steps due to the common and pixel electrodes 120 and 130. Therefore, the steps, resulting from the common and pixel electrodes 120 and 130 have little affect on the above-mentioned rubbing process and the quality of the first alignment layer 140 thereof.

At this point, it is very important to select a proper material for the alignment layer. If the first alignment layer 140 is too soft, the first alignment layer 140 is stained during the above-mentioned rubbing. Therefore, the first alignment layer 140 preferably has a proper hardness.

The hardness of the first alignment layer 140 can be examined using a pencil lead. That is to say, the first alignment layer 140 is sequentially scratched using various pencil leads each having different hardnesses. Then, the hardest pencil lead is selected among those than can be scratched on the alignment layer. The pencil hardness thereof is assumed to be the preferred hardness of the alignment layer. At this point, the pencil hardness is measured according to Japanese Industry Standard (JIS) K5400.

The hardness and density of a conventional pencil lead depends on a mixed proportion of graphite (black lead) and clay in the pencil lead. If the pencil lead is relatively hard, it is denoted as "nH", wherein "H" is the first letter of "hard" and "n" is a number. Whereas, if the pencil lead is relatively soft, it is denoted as "nB", wherein "B" is the first letter of "black". For a larger "n", the hard pencil lead denoted as "nH" is more harder and has a lighter color, whereas the soft pencil lead denoted as "nB" is more softer and has a darker color. In addition, "HB" is used for denoting standard hardness and density, but "F" is used for denoting a medium hardness between "HB" and "H". "F" is the first letter of "firm". The pencil lead has a hardness range of "9H" to "6B", and is used for various purposes depending on its hardness and density.

Returning to FIG. 5, the first alignment layer 140 preferably has a hardness of "1H" to "5H" both inclusive to be prevented from being stained during the rubbing.

Next, as shown in FIG. 6, a planar layer 160 is formed on the upper substrate 150 having a color filter (not shown), and then a polymer is deposited and hardened to form the second alignment layer 170. The second alignment layer 170 is a photosensitive or photo-alignment polymer such as a polyimide-based polymer showing aligning property upon irradiation of light. At this point, a linearly polarized ultra-violet ray is irradiated on the second alignment layer 170 such that surface molecules of the second alignment layer 170 are aligned in a uniform pattern. A photolysis type polymer or a photo-crosslinkable polymer is used as the photo-alignment polymer. For the photolysis type polymer, its high polymer main chain parallel to a polarization plane undergoes anisotropic photolysis by irradiation of a linearly polarized light. Whereas, for the photo-crosslinkable polymer, its high polymer side chains parallel to a polarization plane are selectively crosslinked to one another by irradiation of linearly polarized light.

The above-mentioned linearly polarized ultra-violet ray may be a partially polarized one. In that case, a polarization ratio of the linearly polarized ultra-violet ray is preferably at least above 4 inclusive for 350 nm and above 8 inclusive for 280 nm. To calculate the polarization ratio, a luminance of a polarized ray from a polarizer is measured using a photo-detector. That is to say, the photo-detector is sequentially adjusted such that a polarizing axis of the photo-detector is at first parallel and then perpendicular to that of the polarizer. Parallel luminance and perpendicular luminance are measured when the polarizing axes of the polarizer and photo-detector are parallel and perpendicular to each other, respectively. Then, the polarization ratio is defined as the parallel luminance divided by the perpendicular luminance, which is shown in a first relationship.

Polarization Ratio=Parallel Luminance/
Perpendicular Luminance    Relationship 1.

Though the second alignment layer 170 is photo-aligned using the above-mentioned linearly polarized ray, it can show aligning properties for liquid crystal molecules only if it has some anisotropy. The anisotropy of the alignment layer is measured by polarization experiments using an ultra-violet/visible (UV/VIS) spectroscopy or a Fourier transform infrared (FTIR) spectroscopy. A dichroic subtraction shows the level of the anisotropy of the alignment layer and is calculated by subtracting a perpendicular absorbance from a parallel absorbance. The parallel absorbance is measured when the polarized ray used for the photo-alignment has a parallel polarization direction that is parallel to a light source of the spectroscopy. Whereas, the perpendicular absorbance is measured when the polarized ray used for the photo-alignment has a perpendicular polarization direction that is perpendicular to the light source of the spectroscopy. The above-mentioned relationship is as follows.

Dichroic Subtraction=Parallel Absorbance−
Perpendicular Absorbance            Relationship 2.

At this point, the dichroic subtraction for the second alignment layer 170 of the preferred embodiment is preferably larger than 0.025 inclusive.

After the first and second alignment layers 140 and 170 are respectively formed on the lower and upper substrates 110 and 150, the lower and upper substrates 110 and 150 are arranged to oppose with each other.

At this point, the alignment directions, or microgroove directions of the first and second alignment layers 140 and 170 may be equal or may be opposite to each other. The microgrooves of the first and second alignment layers 140 and 170 are inclined in some direction with respect to the lower and upper substrates 110 and 150, respectively. Therefore, when liquid crystal molecules are interposed between the first and alignment layers 140 and 170, a first portion of the liquid crystal molecules facing an inner surface of the lower substrate 110 have a first pretilt angle corresponding to the first alignment layer 140. Whereas, a second portion of the liquid crystal molecules facing the upper substrate 150 have a second pretilt angle corresponding to the second alignment layer 170. If the first and second pretilt angles of the first and second alignment layers 140 and 170 are large, the alignment directions of the first and second alignment layers 140 and 170 should be considered in arranging the lower and upper substrates 110 and 150. However, because most of the liquid crystal molecules of the IPS LCD device rotate just on a plane parallel to the lower and upper substrates 110 and 150, the IPS LCD device adopts a smaller pretilt angle. Therefore, the alignment directions of the first and second alignment layers 140 and 170 can be regardless during adjusting the lower and upper substrates 110 and 150.

Specifically, a typical TN LCD device adopts about 4 degrees for the pretilt angle, whereas the pretilt angle of the IPS LCD device according to the preferred embodiment is preferably larger than 0 degrees exclusive and smaller than 3 degrees inclusive. If the pretilt angle of the IPS LCD device is very large, a light leak occurs in a black state such that a contrast ratio is deteriorated. In addition, if the pretilt angle of the IPS LCD device is 0 degrees, operation qualities and electro-optic properties are deteriorated. Therefore, the above-mentioned range of 0 degrees exclusive to 3 degrees inclusive is preferred.

The first and second alignment layers 140 and 170, respectively, have first and second anchoring energies for aligning the liquid crystal molecules with the above-mentioned pretilt angles. If the alignment layer has a larger anchoring energy, a larger restoring force acts on the liquid crystal molecules after an electric field applied to the liquid crystal molecules is stopped. Preferably, the first alignment layer 140 has a larger anchoring energy than the second alignment layer 170.

As explained above, the preferred embodiment of the present invention adopts the photo-aligned alignment layer 170 for the upper substrate 150 having the color filter such that the alignment error due to the rubbing is excluded.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An IPS LCD device comprising:
    first and second substrates opposing with each other;
    a common electrode on an inner surface of the first substrate;
    a pixel electrode parallel to the common electrode on the inner surface of the first substrate;
    first and second alignment layers, thea first alignment layer covering the common and pixel electrodes, wherein the first alignment layer is rubbed, the second alignment layer being disposed on an inner surface of the upper substrate, wherein the second alignment layer is photo-aligned, the first alignment layer having an anchoring energy greater than an anchoring energy of the second alignment layer; and
    a liquid crystal layer between the first and second substrates.

2. The device of claim 1, wherein the second alignment layer includes a photo-sensitive material.

3. The device of claim 2, wherein the second alignment layer is a photolysis type polymer.

4. The device of claim 2, wherein the second alignment layer is a photo-crosslinkable polymer.

5. The device of claim 1, wherein a dichroic subtraction of the second alignment layer is larger than 0.025 inclusive.

6. The device of claim 1, wherein a surface of the second alignment layer has a pencil hardness of 1H to 5H both inclusive.

7. The device of claim 1 wherein liquid crystal molecules of the liquid crystal layer are at an angle of 0 degrees exclusive to 3 degrees inclusive with respect to the first and second alignment layers.

* * * * *